United States Patent
Ou

(10) Patent No.: US 12,496,960 B2
(45) Date of Patent: Dec. 16, 2025

(54) LIGHT ASSEMBLY FOR PERFORMING SEVERAL LIGHTING FUNCTIONS

(71) Applicant: VALEO VISION, Bobigny (FR)

(72) Inventor: Rujiu Ou, Foshan (CN)

(73) Assignee: VALEO VISION, Bobigny (FR)

( * ) Notice: Subject to any disclaimer, the term of this patent is extended or adjusted under 35 U.S.C. 154(b) by 176 days.

(21) Appl. No.: 18/258,651

(22) PCT Filed: Dec. 21, 2020

(86) PCT No.: PCT/CN2020/138070
§ 371 (c)(1),
(2) Date: Jun. 21, 2023

(87) PCT Pub. No.: WO2022/133667
PCT Pub. Date: Jun. 30, 2022

(65) Prior Publication Data
US 2024/0042920 A1 Feb. 8, 2024

(51) Int. Cl.
*B60Q 1/14* (2006.01)
*B60Q 1/34* (2006.01)
*H05B 45/34* (2020.01)
*H05B 45/48* (2020.01)

(52) U.S. Cl.
CPC ............. *B60Q 1/1407* (2013.01); *B60Q 1/34* (2013.01); *H05B 45/34* (2020.01); *H05B 45/48* (2020.01); *B60Q 2400/30* (2013.01)

(58) Field of Classification Search
CPC .. H05B 45/44–48; H05B 45/34; H05B 45/30; B60Q 1/1407; B60Q 1/34; B60Q 2400/30; B60Q 1/12; F21W 2103/10; F21W 2103/55; F21W 2102/13; F21S 41/663; F21S 43/14; F21S 41/141
See application file for complete search history.

(56) References Cited

U.S. PATENT DOCUMENTS 8,550,678 B2 10/2013 Cejnek et al.
10,791,605 B2 9/2020 Ichikawa et al.
(Continued)

FOREIGN PATENT DOCUMENTS

| CN | 106028509 A | 10/2016 |
| CN | 107208860 A | 9/2017 |

(Continued)

OTHER PUBLICATIONS

International Search Report issued Sep. 1, 2021 in PCT/CN2020/138070 filed on Dec. 21, 2020, 4 pages.
(Continued)

*Primary Examiner* — Renan Luque
(74) *Attorney, Agent, or Firm* — Oblon, McClelland, Maier & Neustadt, L.L.P.

(57) ABSTRACT

A light assembly includes a power source and three series of lighting units dedicated to respective lighting functions. The light assembly includes a first driver and a second driver, connected in parallel to the power source. The first driver is arranged for applying a first power output to the first and third series of lighting units connected in series, based on a source power generated by the power source and the second driver is arranged for applying a second power output to the second series of lighting units, based on the source power.

17 Claims, 2 Drawing Sheets

(56) References Cited

U.S. PATENT DOCUMENTS

| | | |
|---|---|---|
| 10,807,516 B2 | 10/2020 | Maruyama et al. |
| 10,887,962 B2 | 1/2021 | Qu et al. |
| 2017/0374712 A1 | 12/2017 | Qu et al. |
| 2018/0049283 A1 | 2/2018 | Lee |
| 2018/0283637 A1 | 10/2018 | Murakami et al. |
| 2019/0202344 A1 | 7/2019 | Maruyama et al. |
| 2020/0039423 A1 | 2/2020 | Pan et al. |
| 2020/0094730 A1* | 3/2020 | Yasuda ................. H05B 45/10 |
| 2020/0187329 A1 | 6/2020 | Ichikawa et al. |
| 2021/0076467 A1 | 3/2021 | Qu et al. |
| 2023/0045032 A1* | 2/2023 | Ohta ........................ B60Q 1/40 |

FOREIGN PATENT DOCUMENTS

| | | |
|---|---|---|
| CN | 108696964 A | 10/2018 |
| CN | 109691235 A | 4/2019 |
| JP | 2010241347 A | 10/2010 |
| JP | 2011233624 A | 11/2011 |
| JP | 2013045518 A | 3/2013 |
| JP | 5396134 B2 | 1/2014 |
| JP | 2014099400 A | 5/2014 |
| JP | 2017-33892 A | 2/2017 |
| JP | 2017062883 A | 3/2017 |
| JP | 2017-199520 A | 11/2017 |
| WO | WO 2020/175072 A1 | 9/2020 |

OTHER PUBLICATIONS

Extended European Search Report issued Jul. 12, 2024, in corresponding European Patent Application No. 20966248.5, 21 pages.

Office Action issued Aug. 30, 2024, in corresponding Japanese Patent Application No. 2023-537652, 4 pages.

Search report issued Mar. 28, 2025, in Japanese Patent Application No. 2023/537652, citing reference Nos. 1 and 15-19, 26 pages.

* cited by examiner

[Fig 1]
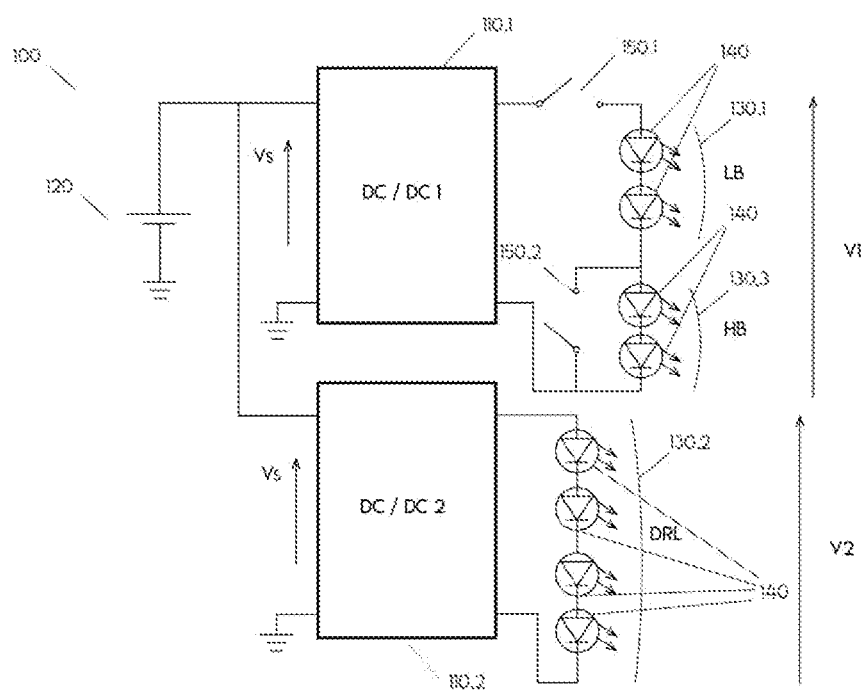

[Fig 2]
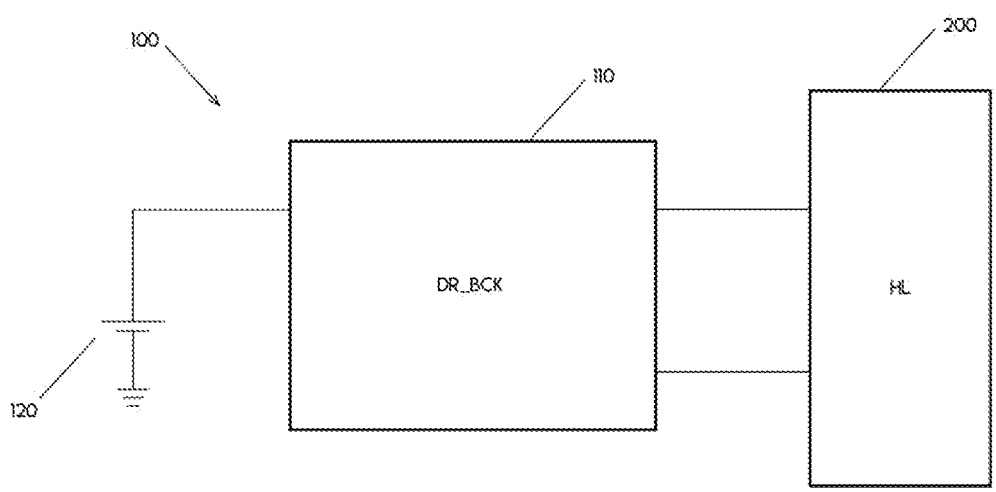

LIGHT ASSEMBLY FOR PERFORMING SEVERAL LIGHTING FUNCTIONS

The present invention concerns the technical field of lighting. It concerns in particular, while not exclusively, a light assembly comprising lighting modules that may be mounted in a headlamp such as a vehicle headlamp.

It is advantageous in the case where several lighting functions are to be performed by a single light assembly.

The Japanese Patent published under number JP5396134B2 discloses a light assembly for a vehicle comprising a DC/DC driver connected to several series of LED arranged for performing respective lighting functions such as: High Beam HB, Low Beam LB and Daytime Running Light, DRL, as shown on FIG. 1 of this patent.

According to this architecture, the HB and LB functions and the DRL function are driven by a single output of a DC/DC driver. Because of this, the LB function and the DRL function cannot be turned-on at the same time, which would however be useful during overtaking of another vehicle. For the same reason, the LB+HB functions and the DRL function cannot be turned on at the same time.

Also, in case a Position Lighting PL function is performed, the DC/DC driver cannot drive the LB function and the PL function at the same time. Also, the DC/DC driver cannot drive the LB-FHB functions and the PL function at the same time.

There is therefore a need to allow more flexible combinations of lighting functions in a light assembly.

The present invention improves the situation.

To this end, a first aspect of the invention concerns a light assembly comprising:
- a power source;
- a first series of lighting units configured to perform a first lighting function;
- a second series of lighting units configured to perform a second lighting function;
- a third series of lighting units configured to perform a third lighting function.

The light assembly comprises a first driver and a second driver. The power source, the first driver and the second driver are connected in parallel. The first driver is arranged for providing a first power output to the first and third series of lighting units connected in series, based on an input power generated by the power source and the second driver is arranged for providing a second power output to the second series of lighting units, based on the input power.

According to the invention, «lighting function» encompasses both:
- a function that aims at improving the lighting of a scene located in front of the light assembly, such as a road to assist the driver of a car for example. These functions may be HB or LB for example;
- a signaling function that aims at improving the visibility of an object in which the light assembly is mounted, such as a car comprising a headlamp with the light assembly. These functions may be DRL or PL for example.

By using two separate drivers for controlling different lighting functions, the drawbacks identified in the prior art are alleviated, as it allows a more flexible combination of lighting functions, in a vehicle for example.

According to some embodiments, the first function is a low beam function, and the third function is a high beam function.

These are complementary lighting functions, as the high beam function is activated only in addition to the low beam function, whereas the low beam function can be activated alone. It is therefore advantageous to use the same driver to control both these functions and this embodiment ensure a trade-off between flexibility for controlling the functions and reduction of costs related to the number of drivers.

In complement, the light assembly may further comprise a first switching unit connected in series with the first and third series of lighting units and a second switching unit connected in parallel to the third series of lighting units.

This ensures that the first function is maintained when the third series of lighting units is short-circuited to the ground. In particular, when the first function is a low beam function, it is imperative to maintain the function activated, even in case of failure on the third series of lighting units. The level of security ensured by the light assembly is therefore improved.

In complement, the first switching unit is in high side position, or in middle side position between the first series and the third series of lighting units.

«High side position» means that the switching unit is located in series between the first driver and the first and third series of lighting units. This allows to increase the security associated with the light assembly, especially when the first series of lighting units is short circuited to the first driver.

According to some embodiments of the invention, the second function may be a daylight function.

Alternatively, the second function may be a position lighting function.

Still alternatively, the second series of lighting units is arranged to perform a Turn Indicator function.

Still alternatively, the second series of lighting units is arranged to perform a position function and a daylight function.

This alternative allows to perform two functions using the same series of lighting units, which reduces the costs of the light assembly, without impacting the number of functions that are performed.

In complement, the second driver is configured to vary the second power output, the position function corresponds to a night power output value and the daylight function corresponds to a second day power output value, different from the night power output value.

This allows to optimize the power consumption of the light assembly as well as the control of the several functions that are performed. For example, the night power output value may be less than the day power output value, which allows to avoid glaring the other drivers at night time and to ensure that the vehicle is visible at day time, therefore improving the security.

According to some embodiments, the first and third series of lighting units are mounted in a headlamp.

Other features and advantages of the invention are made explicit from the description detailed hereafter, and from the attached drawings, on which:

FIG. 1 shows a light assembly according to some embodiments of the invention;

FIG. 2 is a structure of the lighting assembly depicted on FIG. 1.

FIG. 1 illustrates a light assembly 100 according to some embodiments of the invention.

The light assembly 100 comprises a power source 120, a first driver 110.1 and a second driver 110.2. The power source 120 may be a voltage source or a current source according to the invention. In what follows, the example of a voltage source is mostly considered, for illustrative purposes only.

According to a first embodiment, the power source 120 can be a DC voltage source and each of the first and second drivers 110.1 and 110.2 are DC/DC drivers. Alternatively, the power source 120 may be an AC voltage source and the first and second drivers 110.1 and 110.2 are AC/DC drivers.

The power source 120 is configured to generate a source input, such as a source voltage Vs, to be applied to the first driver 110.1 and to the second driver 110.2, which are connected in parallel.

The first driver 110.1 is configured to provide a first power output, such as a first voltage V1 to at least a first series 130.1 of lighting units 140, connected in series and configured to implement a first lighting function, based on the first voltage V1. Alternatively, the first power output may be a first current output.

The second driver 110.2 is configured to apply a second power output, such as a second voltage V2 to at least a second series 130.2 of lighting units 140. Alternatively, the second power output may be a second current output.

In the example shown on FIG. 1, the first voltage V1 is applied to the first series of lighting units 130.1 and also to a third series 130.3 of lighting units 140 configured to implement a third lighting function. No restriction is attached to the number of lighting functions powered by the first voltage V1 issued by the first driver 110.1. The first series 130.1 and third series 130.3 of lighting units are connected in series according to the invention.

The lighting units 140 can be any technology able to emit light when power is applied to it. In what follows, the example of diodes such as LEDs is considered, for illustrative purposes only. The wording «LED» is therefore used to replace «lighting unit» in what follows, without departing from the fact that the lighting unit can encompass other technologies than LED.

In the example illustrated on FIG. 1, the first lighting function is a Low Beam LB function and the third lighting function is a High Beam HB function. LB and HB functions are complementary functions because the HB function is additional to the LB function: this means that the HB function can only be activated while the LB is turned on. However, the LB function can be turned on while the HB function is turned off.

No restriction is attached to the number of LEDs 140 per function. In the example shown on FIG. 1, the first and third functions are implemented by respective series 130.1 and 130.2 of two LEDs 140. However, according to the invention, the first and third functions can be implemented by any numbers n1 and n2 of lighting units 140, n1 and n2 being integers equal to or greater than 1.

So as to selectively activate/deactivate the first and third series 130.1 and 130.3 of LEDs, the light assembly may further comprise a first switching unit 150.1 and a second switching unit 150.2.

The first switching unit 150.1 is connected in series with the first and third series 130.1 and 130.3 of LEDs and the second switching unit 150.2 is connected in parallel with the third series 130.3 of LEDs. No restriction is attached to the position of the first switching unit 150.1, which can be:
- in high side position between the first series 130.1 of LEDs and the first driver 110.1;
- in middle side position between the first series 130.1 of LEDs and the third series 130.3 of LEDs;
- in low side position between the third series 130.3 of LEDs and the ground.

This architecture allows to:
- control the first and third functions as complementary function, where the third function can be activated in addition to the first function, and where the first function can be activated without the third function;
- maintain the first function active even when there is a failure on the third series 130.3, which improves the security of the light assembly 100. It is particularly advantageous when the first function is the low beam function, which needs to be maintained even in case of failure.

As shown on FIG. 1, the first switching unit 150.1 can be connected in high side position, which allows to secure the circuitry when the first series 130.1 is short circuited to the first driver 110.1. This can also be achieved in middle size position.

As explained above, the high side position means that the first switching unit 150.1 is located between the first driver 110.1 and the first series 130.1. For example, the first switching unit 150.2 may be located in the same physical block as the first driver, separate from another physical block, such as a headlamp, comprising the first and third series of LEDs.

The truth table of the switching units and how they are used to activate/deactivate the lighting functions is described hereafter.

To activate the LB function only, the first voltage V1 is applied to the first series 130.1 by closing the first switching unit 150.1 and the second switching unit 150.2.

To activate both LB and HB functions, the first voltage V1 is applied to both the first series 130.1 and the second series 130.2 of LEDs by opening the second switching unit 150.2.

To deactivate both LB and HB functions, the switching unit 150.1 is opened, as shown on FIG. 1.

In the example illustrated on FIG. 1, the second lighting function can be a Daytime Running Light, DRL, function. This is given as example: alternatively, the second lighting function can be a Position Lighting PL function, a Turn Indicator function, a fog lighting function, etc.

According to another embodiment, both DRL and PL functions can be performed by the second series of LEDs. This allows to perform several functions without adding new components to the light assembly 100. The second driver 110.2 may be able to vary the second voltage V2 depending on the function to be performed, such as DRL or PL. For example, a night power output value can be used for PL while a day power output value may be used for DRL. The night power output value may be less than the day power output value, which allows to avoid glaring other drivers at night time, and to ensure that the vehicle is visible at day time. This improves the security associated with the lighting functions and also optimizes the power consumption of the light assembly 100.

To vary the second power output provided by the second driver 110.2, the second driver 110.2 may be externally controlled. Solutions for controlling a driver are well known and are not further described in the present description.

On FIG. 1, the second series 130.2 of LEDs comprises four LEDs. However, no restriction is attached to the number n3 of LEDs of the second series 130.2, which can be any integer equal to or greater than 1.

Also according to alternative embodiments, several series of LEDs can be powered by the second driver 110.2. For example, the second power output, such as the second voltage V2, can power several DRL functions connected in series and that can be selectively activated/deactivated by respective switching units.

In the embodiment described when referring to FIG. 1, the functions HB, LB and DRL can be activated simultaneously, or the functions LB and DRL can be activated at the same time, which is advantageous during overtaking.

Alternatively, when the second function is the PL function instead of the DRL function or in addition to the DRL, the functions LB, HB and PL, or the functions LB and DRL, can be activated at the same time, which is advantageous during night time.

By using two separate drivers for controlling different functions, the drawbacks identified in the prior art are alleviated, as it allows a more flexible combination of lighting functions in a light assembly. A first external control unit, which is not represented on the figures, can be used to control both switching units 150.1 and 150.2.

Another advantage of using separate drivers for different functions, is that the functions are controlled independently.

No restriction is attached to the technologies used for the switching units, which can for example be an electronic switch, such as a transistor (N-MOS, P-MOS, MOSFET or an IGBT for example). Alternatively, each of the switching units can be a bipolar transistor, a power diode, or can even be a mechanical switch.

The drivers 110.1 and 110.2 encompass any technology that is able to convert an input power into an output power different from the input power. The input power and the output power may differ by their type (DC or AC) and/or by their values (two DC voltages/currents having different values). The drivers can for example be electronic circuitries, such as Single Ended Primary Inductor Converters, SEPICs. However, no restriction is attached to the circuitry used as the drivers 110.1 and 110.2, which can encompass other examples, such as buck converters, boost converters and/or buck-boost converters.

It is also to be noted that a first technology can be used for the first driver 110.1 and a second technology, different from the first one, can be used for the second driver 110.2.

No restriction is attached to such control units, which can be a microprocessor arranged for processing command signals from the driver and to control the switching units 150.1 and 150.2 accordingly.

Referring to FIG. 2, there is shown a structure of the light assembly as described on FIG. 1.

The light assembly comprises the voltage source 120, a driving block 110 comprising the first driver 110.1 and 110.2 and a headlamp 200.

The headlamp 200 may comprise at least the first and third series 130.1 and 130.3 of LEDs. In complement, the headlamp 200 may also comprise the second series 130.2 of LEDs.

Referring back to the first switching unit 150.1, it is preferably located inside the driving block 110, which improves the security of the light assembly 100 in case of failure of the first series 130.1 of LEDs 140.

The present invention is not limited to the embodiments described above as examples: it extends to other alternatives.

The invention claimed is:

1. A light assembly comprising:
a power source;
a first series of lighting units configured to perform a first lighting function;
a second series of lighting units configured to perform a second lighting function;
a third series of lighting units configured to perform a third lighting function; wherein:
the light assembly comprises a first driver and a second driver;
the power source, the first driver and the second driver are connected in parallel;
the first driver is arranged for applying a first power output to the first and third series of lighting units connected in series, based on a source power generated by the power source;
the second driver is arranged for applying a second power output to the second series of lighting units, based on the source power;
the light assembly further comprises a first switching unit connected between the first series of lighting units and the third series of lighting units; and
the light assembly further comprises a second switching unit connected in parallel to the third series of lighting units.

2. The light assembly according to claim 1, wherein the first function is a low beam function, and the third function is a high beam function.

3. The light assembly according to claim 1, wherein the second function is a daylight function.

4. The light assembly according to claim 1, wherein the second function is a position lighting function.

5. The light assembly according to claim 1, wherein the second function is a Turn Indicator function.

6. The light assembly according to claim 1, wherein the second series of light is arranged to perform a position function and a daylight function.

7. The light assembly according to claim 6, wherein the second driver is configured to vary the second voltage, and wherein the position function corresponds to a night power output value and the daylight function corresponds to a day power output value, different from the night power output value.

8. The light assembly according to claim 1, wherein the first and third series of lighting units are mounted in a headlamp of the light assembly.

9. The light assembly according to claim 2, wherein the second function is a daylight function.

10. The light assembly according to claim 2, wherein the second function is a position lighting function.

11. The light assembly according to claim 2, wherein the second function is a Turn Indicator function.

12. The light assembly according to claim 2, wherein the second series of light is arranged to perform a position function and a daylight function.

13. The light assembly according to claim 2, wherein the first and third series of lighting units are mounted in a headlamp of the light assembly.

14. The light assembly according to claim 1, wherein the second function is a daylight function.

15. The light assembly according to claim 1, wherein the second function is a position lighting function.

16. The light assembly according to claim 1, wherein the second function is a Turn Indicator function.

17. The light assembly according to claim 1, wherein the second series of light is arranged to perform a position function and a daylight function.

* * * * *